(12) United States Patent
Sollami et al.

(10) Patent No.: US 11,663,642 B2
(45) Date of Patent: May 30, 2023

(54) SYSTEMS AND METHODS OF MULTICOLOR SEARCH OF IMAGES

(71) Applicant: salesforce.com, inc., San Francisco, CA (US)

(72) Inventors: Michael Sollami, Cambridge, MA (US); Yang Zhang, Cambridge, MA (US)

(73) Assignee: Salesforce, Inc., San Francisco, CA (US)

( * ) Notice: Subject to any disclaimer, the term of this patent is extended or adjusted under 35 U.S.C. 154(b) by 755 days.

(21) Appl. No.: 16/594,241

(22) Filed: Oct. 7, 2019

(65) Prior Publication Data
US 2021/0103969 A1    Apr. 8, 2021

(51) Int. Cl.
| | | |
|---|---|---|
| *G06Q 30/06* | (2023.01) | |
| *G06K 9/62* | (2022.01) | |
| *G06T 7/90* | (2017.01) | |
| *G06Q 30/0601* | (2023.01) | |
| *G06N 3/04* | (2023.01) | |
| *G06N 3/08* | (2023.01) | |
| *G06F 16/535* | (2019.01) | |
| *G06T 7/194* | (2017.01) | |
| *G06F 18/22* | (2023.01) | |

(52) U.S. Cl.
CPC ....... *G06Q 30/0625* (2013.01); *G06F 16/535* (2019.01); *G06F 18/22* (2023.01); *G06N 3/04* (2013.01); *G06N 3/08* (2013.01); *G06T 7/194* (2017.01); *G06T 7/90* (2017.01); *G06T 2207/20081* (2013.01); *G06T 2207/20084* (2013.01)

(58) Field of Classification Search
CPC .... G06T 7/90; G06T 7/97; G06T 7/10; G06K 9/6215; G06K 9/6201; G06K 9/6217; G06K 9/62; G06F 16/53; G06F 16/583; G06F 16/5838
USPC ................................................ 382/162–167
See application file for complete search history.

(56) References Cited

U.S. PATENT DOCUMENTS 10,572,988 B1 *   2/2020   Chaturvedi ........... G06T 7/0006
10,755,228 B1 *   8/2020   Hasan .................. G06Q 10/087
(Continued)

FOREIGN PATENT DOCUMENTS

WO   WO-2011044497 A2 *   4/2011   ........... G06K 9/4652
WO   WO-2015200523 A1 *  12/2015   ......... G06F 17/3025

*Primary Examiner* — Sean M Conner
*Assistant Examiner* — Stephen M Brinich
(74) *Attorney, Agent, or Firm* — Butzel Long

(57) ABSTRACT

Systems and methods are provided for receiving at least a first query color, and searching an electronic catalog including a plurality of product images for the first query color to determine a similarity measure between the first query color and a product image of a plurality of product images. The similarity measure may be determined by determining a Euclidean distance between values in a three-dimensional color space for the first query color and a target color of the product image, and determining the similarity measure between the query color and the product image by determining a sum of the similarity measures from all target colors on the product image, weighted by the coverage of each target color. The search results may be transmitted based on the searching of the electronic catalog including the plurality of product images for the first query color.

4 Claims, 8 Drawing Sheets

(56) References Cited

U.S. PATENT DOCUMENTS

2015/0324394 A1* 11/2015 Becker ................ G06F 16/5838
                                                          707/733
2019/0114505 A1* 4/2019 Albayrak ............ G06F 16/5854

* cited by examiner

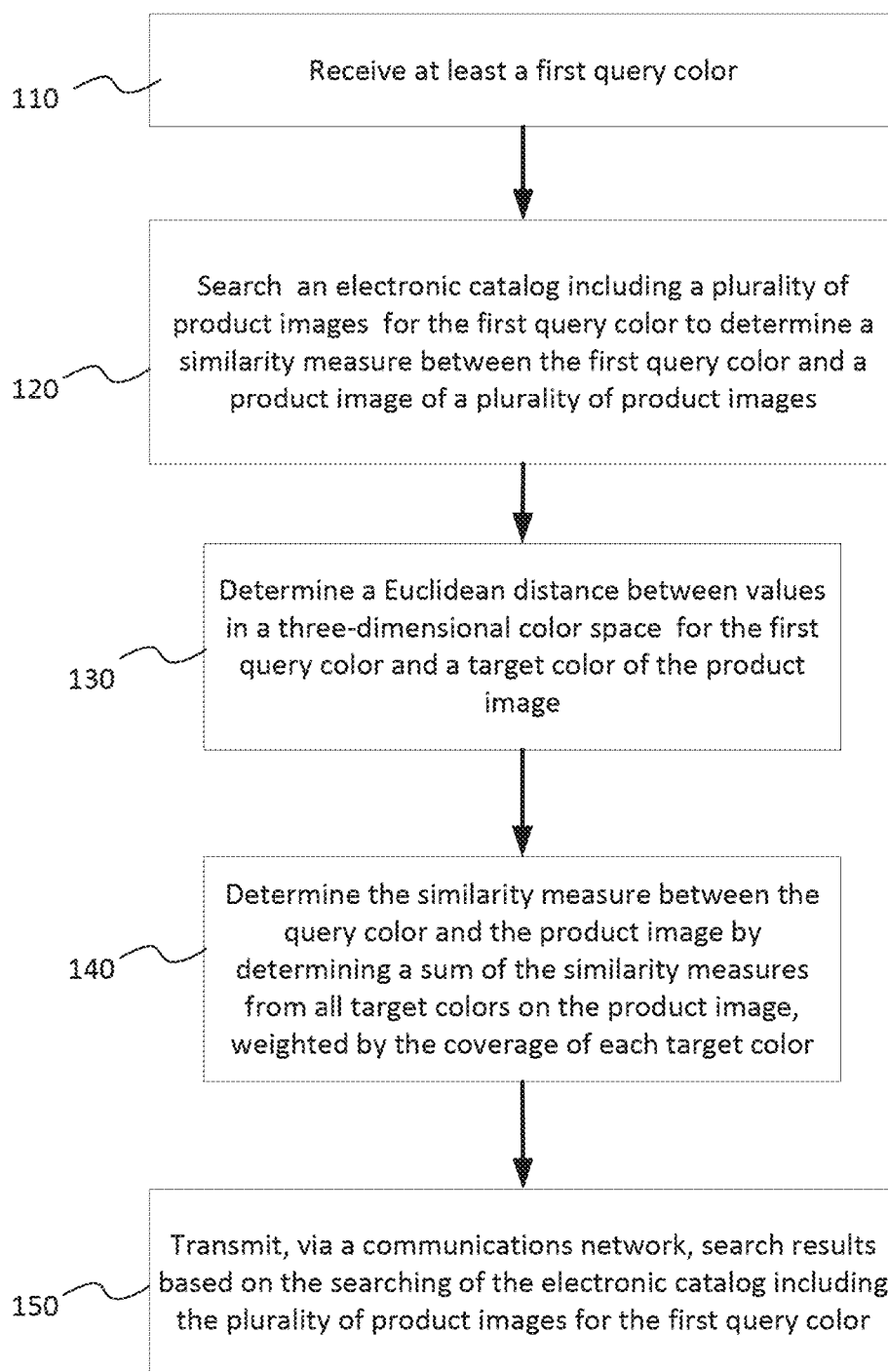

SYSTEMS AND METHODS OF MULTICOLOR SEARCH OF IMAGES

BACKGROUND

Present methods of color search require that each product image of a catalog be labeled or tagged with attributes regarding the product. Some websites may allow for searching for a product (e.g., a garment) by a single color by selecting a color option from a list of color options. The website may retrieve products having the selected color based on the labeling, and present them to the user.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

FIGS. 1A-1B show an example method of searching an electronic catalog including product images for one or more query colors to determine a similarity measure between the query color and a product image according to implementations of the disclosed subject matter.

DETAILED DESCRIPTION

Figure 1B:
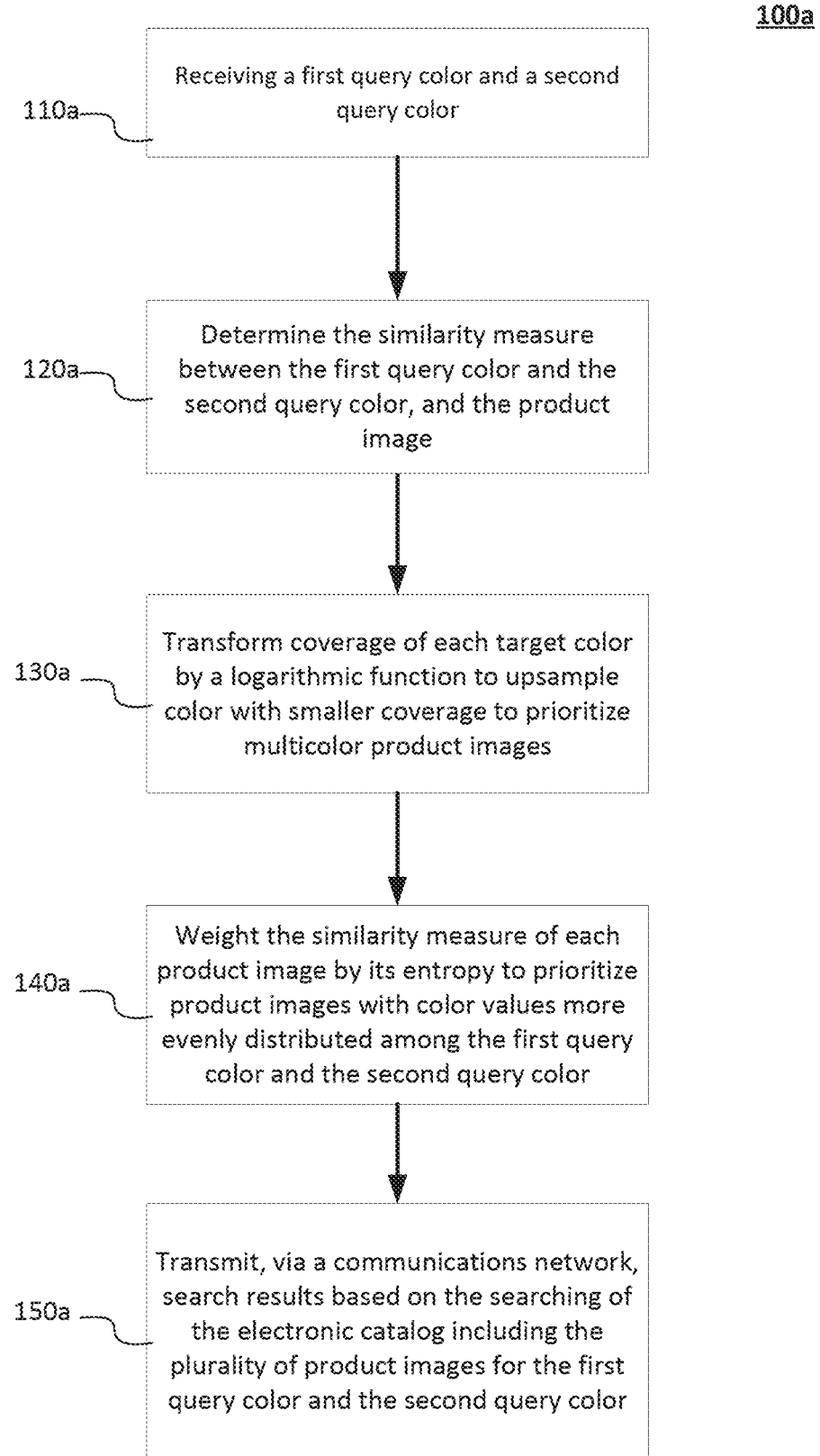

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Implementations of the disclosed subject matter provide systems and methods of searching an electronic catalog of product images for a query color by determining a similarity measure between the query color and the product image. The similarity between the query color and a target color on the product image may be calculated from the Euclidean distance between their three-dimensional color space values. The similarity between the query color and the product image may be the sum of the similarities from all target colors on the image, weighted by the coverage of each target color. Determining a similarity measure for a plurality of query colors may be similar to the method used for a single query color, in that the similarity measure may be calculated for each query color against the product image. The similarity measure of each product image may be weighted by its entropy to prioritize product images with color values more evenly distributed among the query colors.

A color dominance model may be constructed by extracting color data histograms for each image of the electronic catalog. Cluster analysis may be performed, and color masks may be generated for each image. A convolutional model may be trained, and a resultant color network (i.e., neural network) may be stored. The resultant color network may be applied to other images and/or electronic catalogs, and searches may be conducted using one or more query colors.

The constructed model may be used to inference over all images in a target catalog. For each image in the catalog, object detection and background subtraction are performed. The color network may be passed over each image to compute feature vectors, and the nearest neighbor products in the vectors may be determined. When a query is received, a search may be conducted using a fixed color or multiple colors, with optional weighting. The results of the search may present products of the electronic catalog that have colors that are similar to the one or more query colors.

Implementations of the disclosed subject matter may improve upon present systems for color searching in electronic catalogs, which require that each product image of a catalog be labeled and/or tagged with attributes regarding the product. That is, present systems are unable to determine colors of an image in a catalog unless the image has been tagged (e.g., using text) to identify the colors of the product. Implementations of the disclosed subject matter may determine colors of images of products in a product catalog without the use of any tagging, so that users may search for products using one or more query colors. Implementations of the disclosed subject matter may also provide search for products for a palette of colors. In some implementations, one or more of the colors of the color palette may be weighted, so that similar products in the catalog having the colors and weighting may be displayed.

FIG. 1A shows an example method 100 of searching an electronic catalog including product images for one or more query colors to determine a similarity measure between the query color and a product image according to implementations of the disclosed subject matter. At operation 110, a server (e.g., central component 600 and/or second computer 700 shown in FIG. 5, and/or databases system databases 1200a-1200d shown in FIG. 6) may receive at least a first query color. In some implementations, the server may receive the first query color or other query colors from, for example, computer 500 shown in FIG. 5. For example, computer 500 (shown in FIG. 5) may output display 200 (shown in FIG. 2) on a display 520. As shown in FIG. 2, the computer 500 may receive a selection from slider 206 of a color from a point along the color spectrum between color spectrum point 202 and color spectrum point 204. In another example, the computer 500 may receive a selection from color palette 208, where the selection is displayed in area 210, and the selection may be displayed as a first customized palette selection 212.

At operation 120 shown in FIG. 1A, the server may search an electronic catalog including a plurality of product images stored in at least one storage device (e.g., storage 710 shown in FIG. 3 and/or databases system databases 1200a-1200d shown in FIG. 4) communicatively coupled to the server for the first query color. The server may determine a similarity measure between the first query color and a product image of a plurality of product images in operations 130 and 140.

The server may determine a Euclidean distance between values in a three-dimensional color space for the first query color and a target color of the product image at operation at operation 130. The three-dimensional color space may be CIE LAB color space. In some implementations, the color space of the product image and/or the first query color may be converted to CIE LAB color space by the server before determining the similarity measure, if the color space of the product image and/or the first query color are in a different color space. For example, the color space of product image and/or the first query color may be RGB (Red Green Blue) color space or HSB (Hue Saturation Brightness) color space, where the RGB or HSB color space may be converted by the server to LAB color space before determining the similarity measure.

The server may determine the similarity measure between the query color and the product image by determining a sum of the similarity measures from all target colors of the product image, weighted by the coverage of each target color at operation 140. That is, the server may determine the sum of the Euclidian distances between values for the first query color and the target colors of the product image, and may weight the sums.

The server may transmit search results based on the searching of the electronic catalog including the plurality of product images for the first query color. For example, the central component 600 and/or second computer 700 shown in FIG. 5 may transmit the search results to the computer 500. The search results may be displayed on display 200 shown in FIG. 2, where products 222, 224, 226, 228, 230, 232, 234, 236, and 238 may be products of the electronic catalog that include the first query color.

Figure 2:
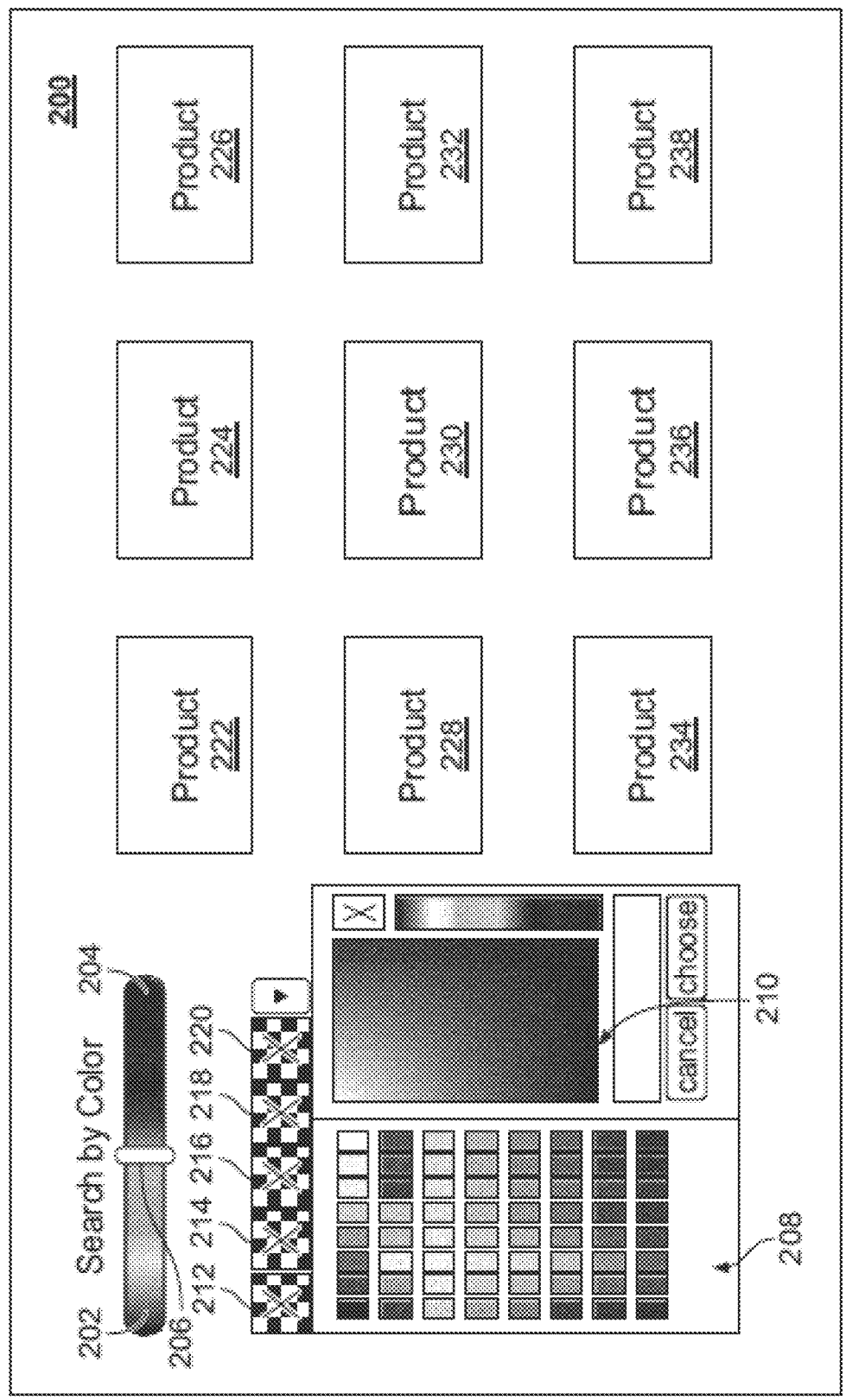
FIG. 2 shows an example display for selecting one or more colors to be used to search a product catalog, and to display the search results according to implementations of the disclosed subject matter.

FIG. 1B shows an example method 100a of searching an electronic catalog including product images for a plurality of colors to determine a similarity measure between the query colors and a product image according to implementations of the disclosed subject matter. The method 100a may be generally similar to the method 100 shown in FIG. 1A and described above, but a plurality of colors are searched in method 100a.

Figure 5:
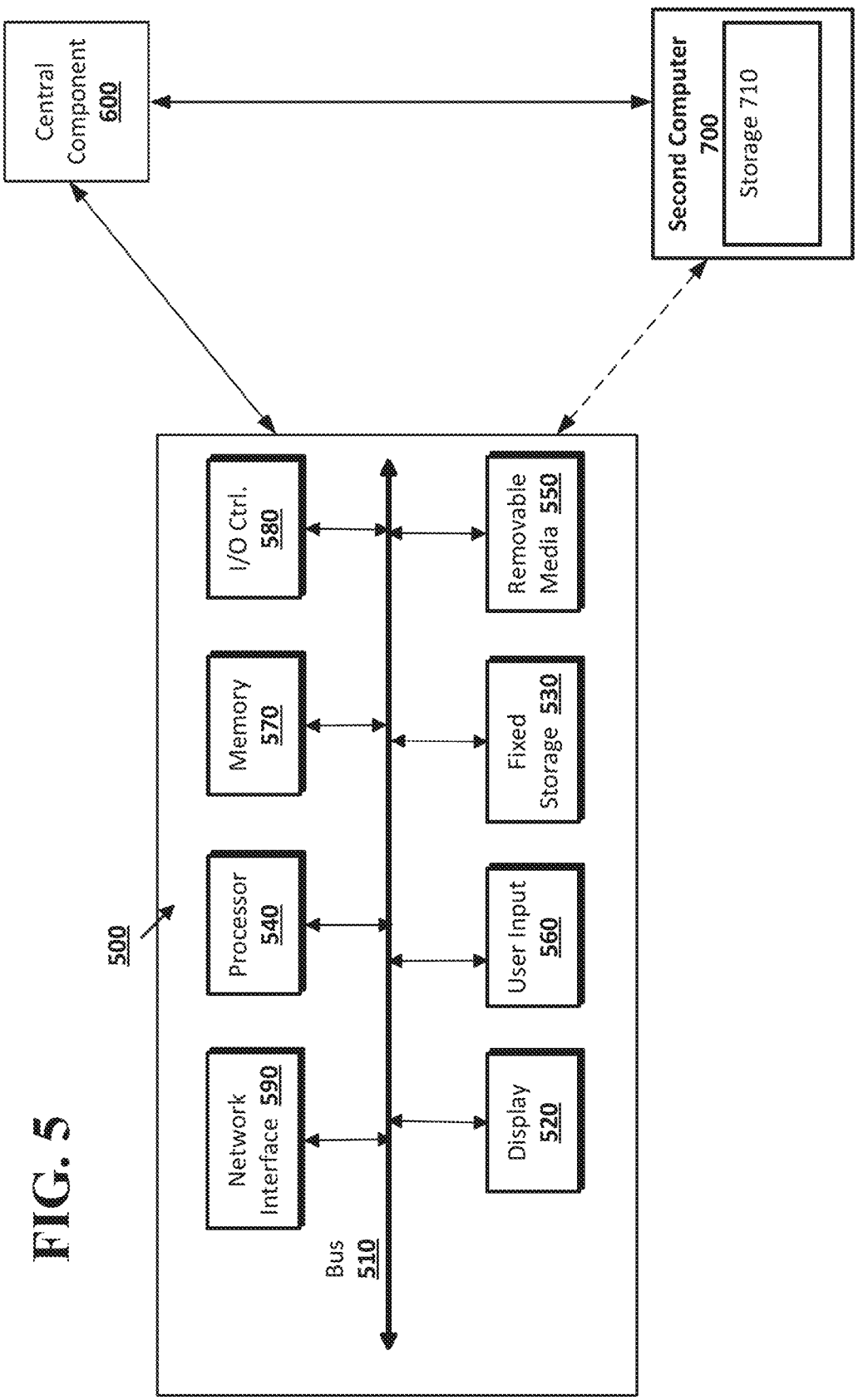
FIG. 5 shows a computer system according to an implementation of the disclosed subject matter.
Figure 6:
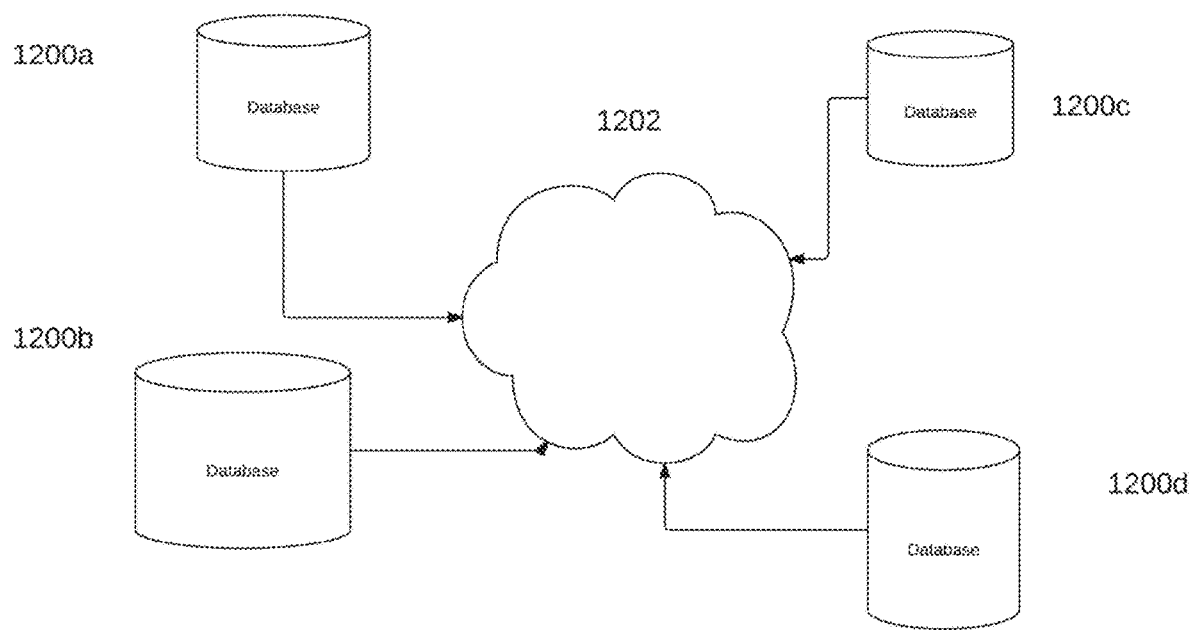
FIG. 6 shows a network configuration according to an implementation of the disclosed subject matter.

At operation 110a, a first query color and a second query color may be received by the server (e.g., central component 600 and/or second computer 700 shown in FIG. 5, and/or databases system databases 1200a-1200d shown in FIG. 6). In some implementations, the server may receive the first and second query color or other query colors from, for example, computer 500 shown in FIG. 5. For example, computer 500 (shown in FIG. 5) may output display 200 (shown in FIG. 2) on a display 520. The computer 500 may receive a selection of the first query color and the second query color from color palette 208, where each selection is displayed in area 210. The selection of the first query color may be displayed in the first customized palette selection 212, and the selection of the second query color may be displayed in second customized palette selection 214. Selections for additional query colors (e.g., third query color, fourth query color, fifth query color, and the like) may be selected and displayed as the third customized palette selection 216, the fourth customized palette selection 218, and the fifth customized palette selection 220.

At operation 102a, the server may determine the similarity measure between the first query color and the second query color, and the product image. The server may determine the similarity measure by transforming coverage of each target color by a logarithmic function to upsample color with smaller coverage to prioritize multicolor product images at operation 130a, and weighting the similarity measure of each product image by its entropy to prioritize product images with color values more evenly distributed among the first query color and the second query color as operation 140a. The server may transmit the search results based on the searching of the electronic catalog including the plurality of product images for the first query color and the second query color at operation 150a. For example, the central component 600 and/or second computer 700 shown in FIG. 5 may transmit the search results to the computer 500. The search results may be displayed on display 200 shown in FIG. 2, where products 222, 224, 226, 228, 230, 232, 234, 236, and 238 may be products of the electronic catalog that include both the first query color and the second query color.

Figure 3A:
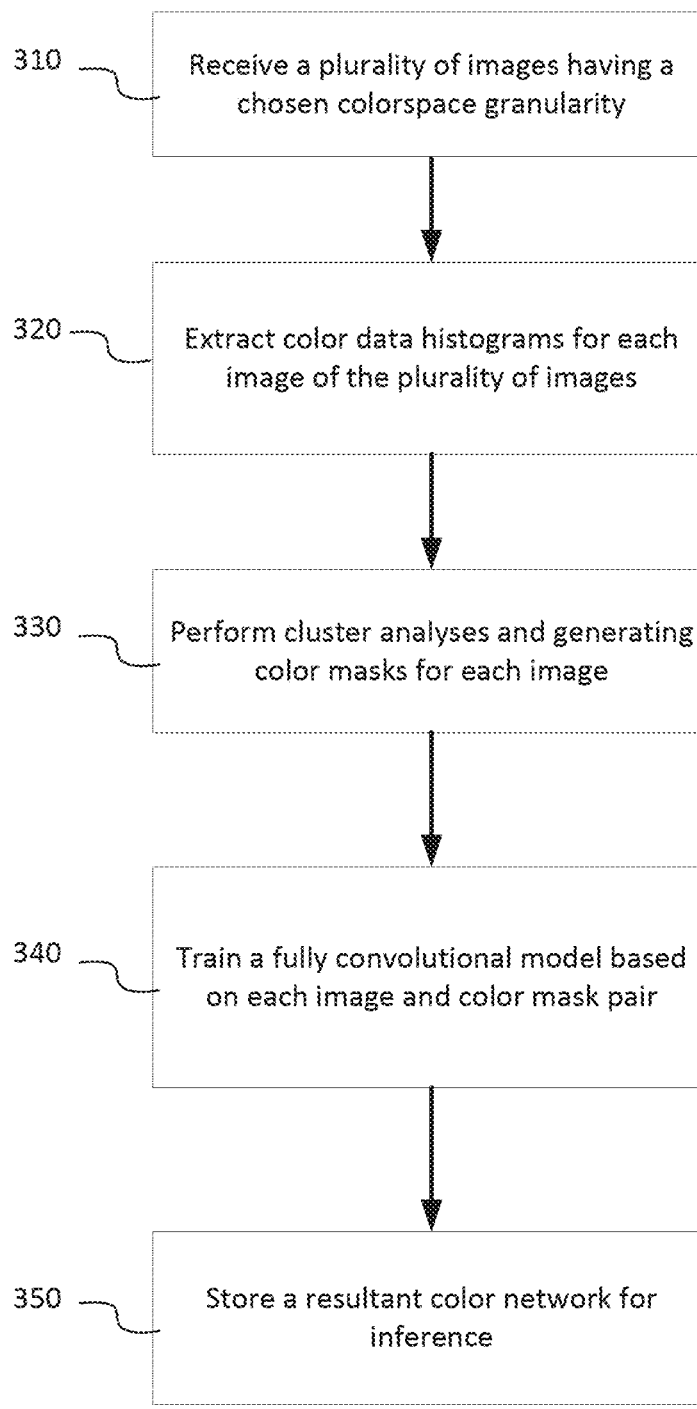
FIGS. 3A-3B show example methods of training a fully convolutional model based on images and color masks according to implementations of the disclosed subject matter.
Figure 3B:
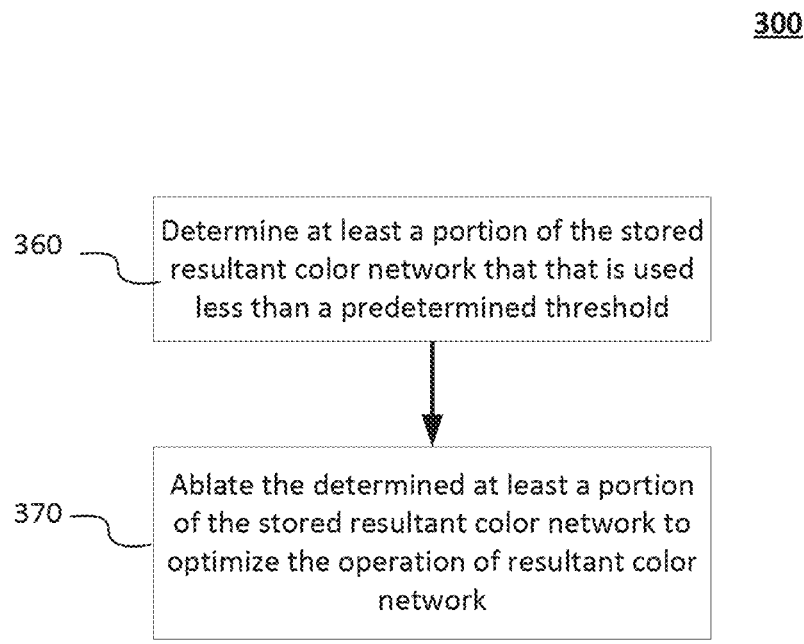

FIGS. 3A-3B show example methods of training a fully convolutional model based on images and color masks according to implementations of the disclosed subject matter. FIG. 3A shows a method 300 of forming a color dominance model according to an implementation of the disclosed subject matter. At operation 310, a server (e.g., central component 600 and/or second computer 700 shown in FIG. 5) may receive a plurality of images having a chosen color space granularity (e.g., the number of bits used by the server to represent colors within the boundaries of the color space). The images may be received by the server from, for example, computer 500 shown in FIG. 5, and/or databases system databases 1200a-1200d shown in FIG. 6. At operation 320, the server may extract color data histograms for each image of the plurality of images. The histograms may include pixel values for the images, and/or a map of the locations of the pixels within the images. The color data histograms may be used to determine whether the pixels are randomly spread out, and/or whether one or more colors are localized within an image (i.e., a low entropy portion of the image).

At operation 330, the server may perform cluster analyses and generate color masks (e.g., binary masks) for each image. Color masks may be, for example, pixels that indicate where a color appears. In some implementations, a mask may be determined for each palette. For a palette of N colors, N binary segmentation masks may be determined. A tree structure may be used for clustering, where the pixels of images are merged until the most representative remain. In some implementations, Wu's algorithm and/or other suitable minimum variance methods may be used by the server to determine the masks.

The server may train a fully convolutional model based on each image and color mask pair at operation 340. A resultant color network (i.e., neural network) for inference may be stored in a storage device (e.g., storage 710 shown in FIG. 5 and/or databases system databases 1200a-1200d shown in FIG. 6) communicatively coupled to the server. The resultant color network may be used to perform color query searches of one or more electronic catalogs and/or images to determine similarity between the query color and one or more images.

FIG. 3B shows that method 300 may include operation 360, where the server may determine that at least a portion of the stored resultant color network is used less than a predetermined threshold. At operation 370, the server may ablate the determined portion of the stored resultant color network to optimize the operation of resultant color network. In some implementations, the ablation may delete one or more nodes, kernels, and/or portions of the color network that may not increase the performance of the color network (e.g., by a predetermined amount).

Figure 4:
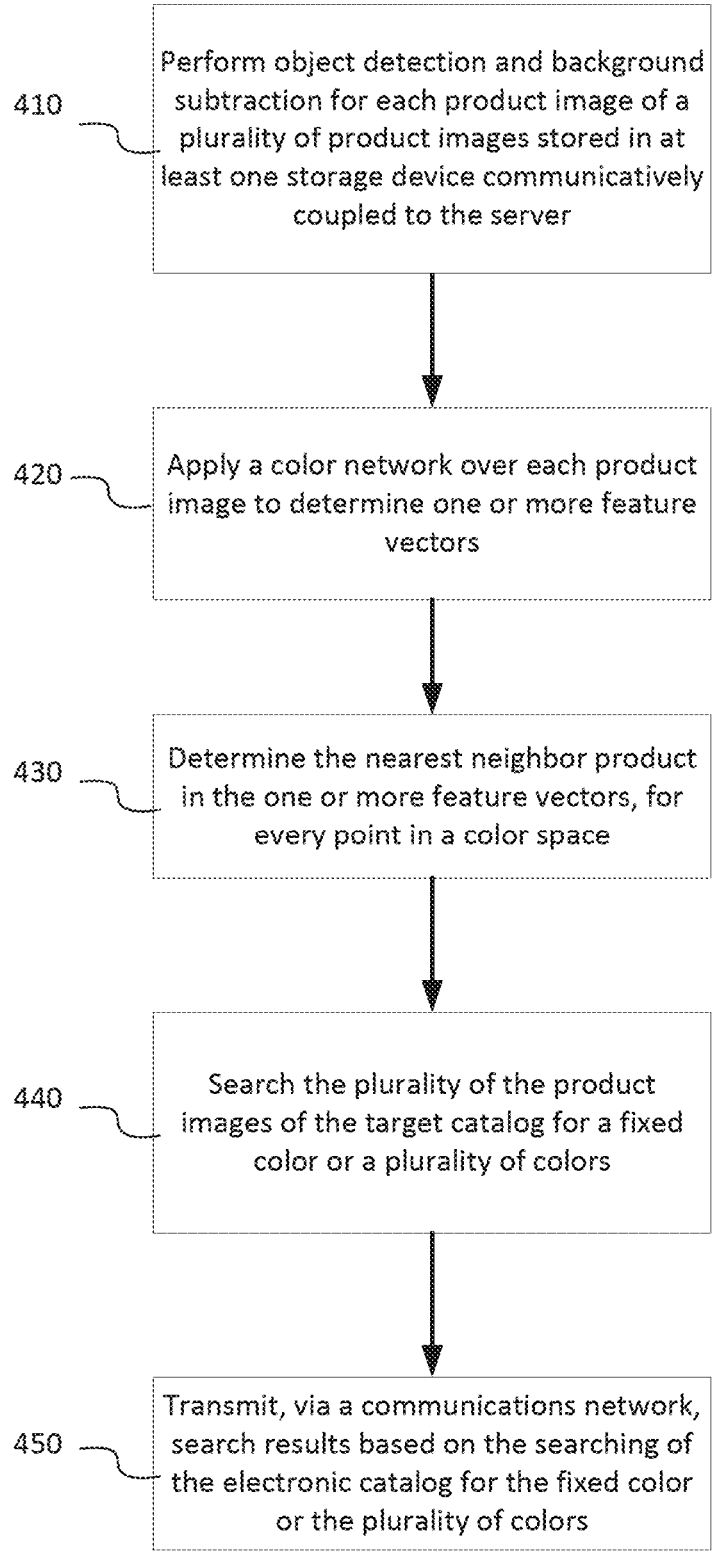
FIG. 4 shows an example method of determining nearest neighbor products for feature vectors and searching product images according to implementations of the disclosed subject matter.

FIG. 4 shows an example method 400 of determining nearest neighbor products for feature vectors and searching product images according to implementations of the disclosed subject matter. The method 400 may be applied to an electronic catalog of images after the construction of the color network using method 300 described above in connection with FIGS. 3A-3B. At operation 410, a server (e.g., central component 600 and/or second computer 700 shown in FIG. 5) may perform object detection and background subtraction for each product image of a plurality of product images stored in at least one storage device (e.g., storage 710 shown in FIG. 5 and/or databases system databases 1200a-1200d shown in FIG. 6) communicatively coupled to the server. The object detection and background subtraction may separate the product in the image from the background of the image, so that a color search may performed on the separated product. That is, the background of the image may be removed so that the colors of the background in the electronic catalog of images are not used for a color search that is performed. In some implementations, dominant colors of the separated object colors (e.g., one or more colors that comprise a predetermined percentage of the separated object) may be determined so that the query colors of the search may be compared with the dominant colors.

At operation 420, the server may apply the color network over each product image to determine one or more feature vectors. The features of the one or more feature vectors may include at least one of dominant colors, color ratios, and masks. The color network may determine binary masks for each of the images of the electronic catalog, and may determine the total number of pixels in each image. In some implementations, the entropy of the pixels may be determined by the server so as to determine how globular the colors are (e.g., determine the percentage of an image that is a predetermined color, and/or the ratio of each of the determined colors to one another).

The server may determine the nearest neighbor product in the one or more feature vectors, for every point in a color space at operation 430. The server may determine the nearest neighbor by performing locality sensitive hashing (LSH) of a Hamming distance between the one or more feature vectors. In some implementations, the nearest neighbor may be determined using an approximate principal direction (APD) tree. APD trees may use iterations below a predetermined amount to find splitting planes for recursively partitioning the data. APD trees have a reduced run-time compared to computationally-expensive PCA (Principal Component Analysis) trees, and have similar time-complexity to that of lower-accuracy RP (random projection) trees.

The server may search the plurality of the product images of the target catalog for a fixed color or a plurality of colors at operation 440. In some implementations, the searching at the server for the fixed color or the plurality of colors may be a weighted search. For example, the server may receive (e.g., from computer 500 shown in FIG. 5) a selected weight for one or more colors in a color palette (e.g., customized palette selection 212, 214, 216, 218, 220 shown in FIG. 2). The search results may order the products based on the selected weights (e.g., where products having colors that have an increased similarity to the weighted colors are placed at the beginning of the results, with subsequent products being displayed having decreasing similarity to the weighted colors).

The server may transmit search results based on the searching of the electronic catalog for the fixed color or the plurality of colors at operation 450. For example, the central component 600 and/or second computer 700 shown in FIG. 5 may transmit the search results to the computer 500. The search results may be displayed on display 200 shown in FIG. 2, where products 222, 224, 226, 228, 230, 232, 234, 236, and 238 may be products of the electronic catalog that include the fixed color or the plurality of colors.

Implementations of the presently disclosed subject matter may be implemented in and used with a variety of component and network architectures. FIG. 5 is an example computer 500 suitable for implementing implementations of the presently disclosed subject matter. As discussed in further detail herein, the computer 500 may be a single computer in a network of multiple computers. In some implementations, the computer 500 may be used to provide the search results (e.g., display 200 shown in FIG. 2) for the one or more colors searched in the electronic catalog. As shown in FIG. 5, the computer 500 may communicate with a central or distributed component 600 (e.g., server, cloud server, database, cluster, application server, neural network system, or the like). The central component 600 may communicate with one or more other computers such as the second computer 700, which may include a storage device 710. The second computer 700 may be a server, cloud server, neural network system, or the like. The storage 710 may use any suitable combination of any suitable volatile and non-volatile physical storage mediums, including, for example, hard disk drives, solid state drives, optical media, flash memory, tape drives, registers, and random access memory, or the like, or any combination thereof.

The storage 710 of the second computer 700 can store data (e.g., one or more image of the electronic catalog, the resultant color network data, or the like). Further, if the systems shown in FIGS. 5-6 are multitenant systems, the storage can be organized into separate log structured merge trees for each instance of a database for a tenant. Alternatively, contents of all records on a particular server or system can be stored within a single log structured merge tree, in which case unique tenant identifiers associated with versions of records can be used to distinguish between data for each tenant as disclosed herein. More recent transactions can be stored at the highest or top level of the tree and older transactions can be stored at lower levels of the tree. Alternatively, the most recent transaction or version for each record (i.e., contents of each record) can be stored at the highest level of the tree and prior versions or prior transactions at lower levels of the tree.

The information obtained to and/or from a central component 600 can be isolated for each computer such that computer 500 cannot share information with central component 600 (e.g., for security and/or testing purposes). Alternatively, or in addition, computer 500 can communicate directly with the second computer 700.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces. The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks, as shown in FIGS. 5-6.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIGS. 5-6 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

FIG. 6 shows an example network arrangement according to an implementation of the disclosed subject matter. Four separate database systems 1200*a-d* at different nodes in the network represented by cloud 1202 communicate with each other through networking links 1204 and with users (not shown). In some implementations, the one or more of the database systems 1200*a-d* may be located in different geographic locations. Each of database systems 1200 can be operable to host multiple instances of a database, where each instance is accessible only to users associated with a particular tenant. Each of the database systems can constitute a cluster of computers along with a storage area network (not shown), load balancers and backup servers along with firewalls, other security systems, and authentication systems. Some of the instances at any of database systems 1200*a-d* may be live or production instances processing and committing transactions received from users and/or developers, and/or from computing elements (not shown) for receiving and providing data for storage in the instances.

One or more of the database systems 1200*a-d* may include at least one storage device, such as in FIG. 6. For example, the storage can include memory 570, fixed storage 530, removable media 550, and/or a storage device included with the central component 600 and/or the second computer 700. The tenant can have tenant data stored in an immutable storage of the at least one storage device associated with a tenant identifier.

In some implementations, the one or more servers shown in FIGS. 5-6 can store the data (e.g., images of products of the electronic catalog and the like) in the immutable storage of the at least one storage device (e.g., a storage device associated with central component 600, the second computer 700, and/or the database systems 1200*a*-1200*d*) using a log-structured merge tree data structure.

The systems and methods of the disclosed subject matter can be for single tenancy and/or multitenancy systems. Multitenancy systems can allow various tenants, which can be, for example, developers, users, groups of users, and/or organizations, to access their own records (e.g., tenant data and the like) on the server system through software tools or instances on the server system that can be shared among the various tenants. The contents of records for each tenant can be part of a database containing that tenant. Contents of records for multiple tenants can all be stored together within the same database, but each tenant can only be able to access contents of records which belong to, or were created by, that tenant. This may allow a database system to enable multitenancy without having to store each tenants' contents of records separately, for example, on separate servers or server systems. The database for a tenant can be, for example, a relational database, hierarchical database, or any other suitable database type. All records stored on the server system can be stored in any suitable structure, including, for example, a log structured merge (LSM) tree.

Further, a multitenant system can have various tenant instances on server systems distributed throughout a network with a computing system at each node. The live or production database instance of each tenant may have its transactions processed at one computer system. The computing system for processing the transactions of that instance may also process transactions of other instances for other tenants.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "masking," "generating," "transmitting," "selecting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:
   receiving, at a server, at least a first query color and a second query color;
   searching, at the server, an electronic catalog including a plurality of product images stored in at least one storage device communicatively coupled to the server for the first query color to determine a similarity measure between the first query color, the second query color, and a product image of a plurality of product images, wherein the similarity measure is determined by:
      determining, at the server, a Euclidean distance between values in a three-dimensional color space for the first query color, the second query color, and a target color of the product image; and
      determining, at the server, the similarity measure between the first query color, the second query color, and the product image by:
         determining a sum of the similarity measures from all target colors on the product image, weighted by the coverage of each target color; and
         weighting the similarity measure of each product image by its entropy to prioritize product images with color values more evenly distributed among the first query color and the second query color; and
   transmitting, via a communications network coupled to the server, search results based on the searching of the electronic catalog including the plurality of product images for the first query color and the second query color.

2. The method of claim 1, wherein the determining the similarity measure further comprises:
   transforming coverage of each target color by a logarithmic function to upsample color with smaller coverage to prioritize multicolor product images.

3. A system comprising:
   at least one storage device to store an electronic catalog including the plurality of product images; and
   a server communicatively coupled to the at least one storage device to receive at least a first query color and a second query color, to search the electronic catalog including the plurality of product images for the first query color, to determine a similarity measure between the first query color, the second query color, and a product image of a plurality of product images, wherein the similarity measure is determined by a Euclidean distance between values in a three-dimensional color space for the first query color, the second query color, and a target color of the product image, and the similarity measure between the first query color, the second query color, and the product image by determining a sum of the similarity measures from all target colors on the product image, weighted by the coverage of each target color, and by weighting the similarity measure of each product image by its entropy to prioritize product images with color values more evenly distributed among the first query color and the second query color,
   wherein the server transmits, via a communications network coupled to the server, search results based on the searching of the electronic catalog including the plurality of product images for the first query color and the second query color.

4. The system of claim 3, wherein the server determines the similarity measure by transforming coverage of each target color by a logarithmic function to upsample color with smaller coverage to prioritize multicolor product images.

* * * * *